United States Patent
Ishidera

(10) Patent No.: US 6,910,139 B2
(45) Date of Patent: Jun. 21, 2005

(54) SOFTWARE PROCESSING APPARATUS WITH A SWITCHING PROCESSING UNIT FOR DISPLAYING ANIMATION IMAGES IN AN ENVIRONMENT OPERATING BASE ON TYPE OF POWER SUPPLY

(75) Inventor: Nobutaka Ishidera, Inagi (JP)

(73) Assignee: Fujitsu Limited, Kaswasaki (JP)

( * ) Notice: Subject to any disclaimer, the term of this patent is extended or adjusted under 35 U.S.C. 154(b) by 633 days.

(21) Appl. No.: 09/778,088

(22) Filed: Feb. 7, 2001

(65) Prior Publication Data

US 2002/0040442 A1 Apr. 4, 2002

(30) Foreign Application Priority Data

Oct. 2, 2000 (JP) .................................. 2000-301636

(51) Int. Cl.[7] .............................. G06F 1/32; G09G 5/00
(52) U.S. Cl. ...................... 713/320; 713/322; 713/340; 345/211; 345/214
(58) Field of Search ................................. 345/214, 211; 713/320, 340, 300, 323, 322, 324; 348/384

(56) References Cited

U.S. PATENT DOCUMENTS

| 5,021,679 | A | * | 6/1991 | Fairbanks et al. ............ 307/66 |
| 5,218,704 | A | | 6/1993 | Watts, Jr. |
| 5,560,022 | A | * | 9/1996 | Dunstan et al. ............. 713/300 |
| 5,560,024 | A | * | 9/1996 | Harper et al. ............... 713/322 |
| 5,694,607 | A | * | 12/1997 | Dunstan et al. ............. 713/340 |
| 5,745,375 | A | * | 4/1998 | Reinhardt et al. .......... 700/286 |
| 5,909,585 | A | | 6/1999 | Shinmiya |
| 5,949,484 | A | * | 9/1999 | Nakaya et al. ............ 348/384.1 |
| 5,982,147 | A | * | 11/1999 | Anderson ................... 320/132 |
| 5,996,083 | A | | 11/1999 | Gupta et al. |
| 5,996,084 | A | * | 11/1999 | Watts ........................ 713/323 |
| 6,078,871 | A | * | 6/2000 | Anderson ..................... 702/63 |
| 6,118,306 | A | * | 9/2000 | Orton et al. .................. 327/44 |
| 6,240,521 | B1 | * | 5/2001 | Barber et al. ............... 713/323 |
| 6,418,535 | B1 | * | 7/2002 | Kulakowski et al. ....... 713/320 |
| 6,601,179 | B1 | * | 7/2003 | Jackson et al. ............. 713/322 |
| 6,603,469 | B1 | * | 8/2003 | Gettemy et al. ............ 345/211 |
| 6,665,806 | B1 | * | 12/2003 | Shimizu ..................... 713/324 |

FOREIGN PATENT DOCUMENTS

| DE | 69027510 T2 | 1/1997 |
| DE | 69320180 T2 | 12/1998 |
| DE | 69328408 T2 | 6/1999 |
| JP | 0501991 | 1/1993 |
| JP | 5-346922 | 12/1993 |
| JP | 7-81186 | 3/1995 |
| JP | 9-231194 | 9/1997 |
| WO | WO 93/20498 | 10/1993 |

OTHER PUBLICATIONS

Official Action issued by German Patent Office for related application 10114894.1–53.

* cited by examiner

Primary Examiner—Chun Cao
(74) Attorney, Agent, or Firm—Staas & Halsey LLP

(57) ABSTRACT

In a software processing apparatus, an operating environment determining unit determines whether an operating environment requires power saving or not at the time of executing a process such as an animation displaying process, and a switching unit performs a simplified process of light load by making a part of the functions of software valid in the environment requiring power saving, and executes a process of heavy load in which all of the functions of the software are valid in the environment which does not require power saving.

23 Claims, 14 Drawing Sheets

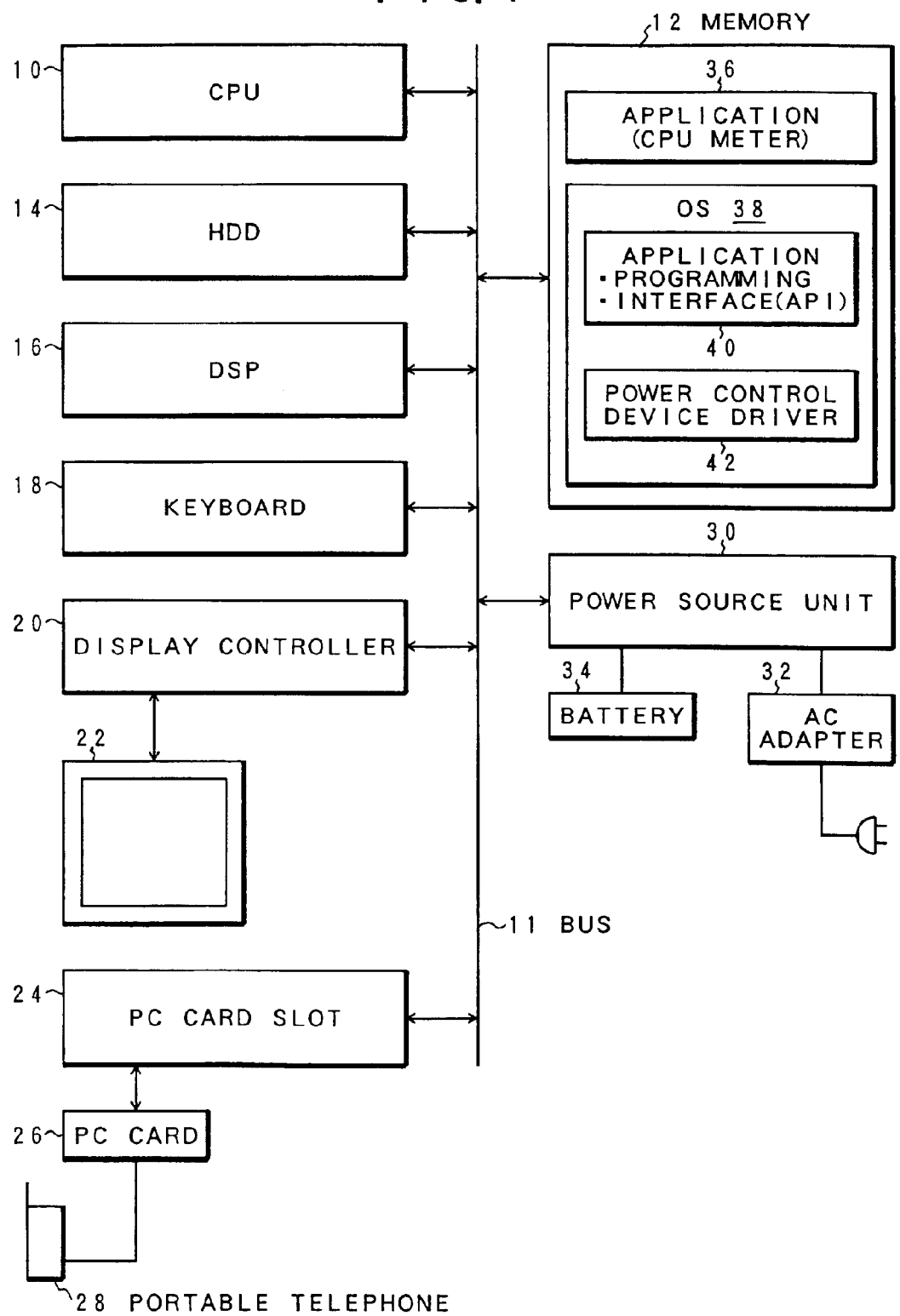

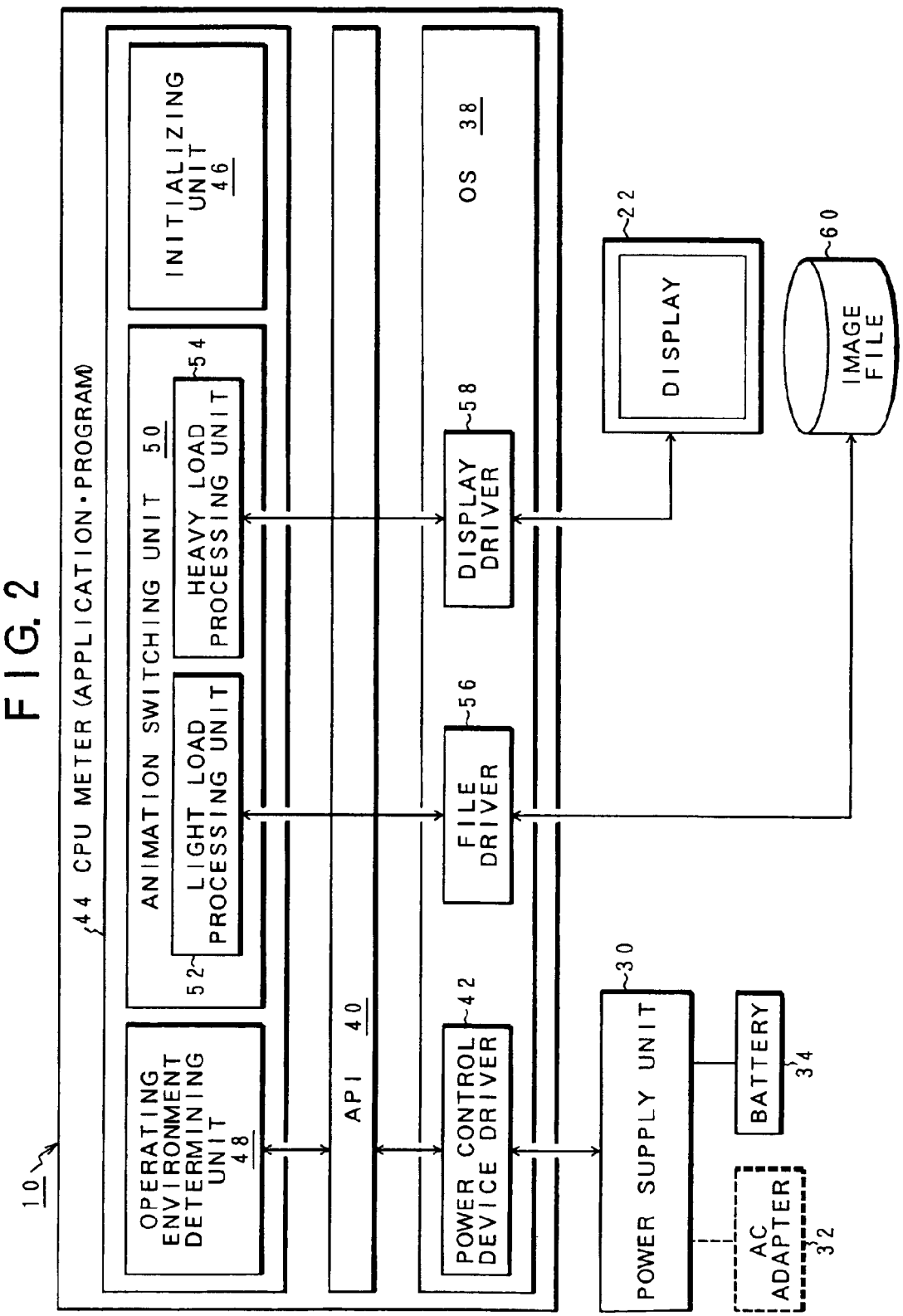

BASIC IMAGES

ANIMATION

STILL IMAGE

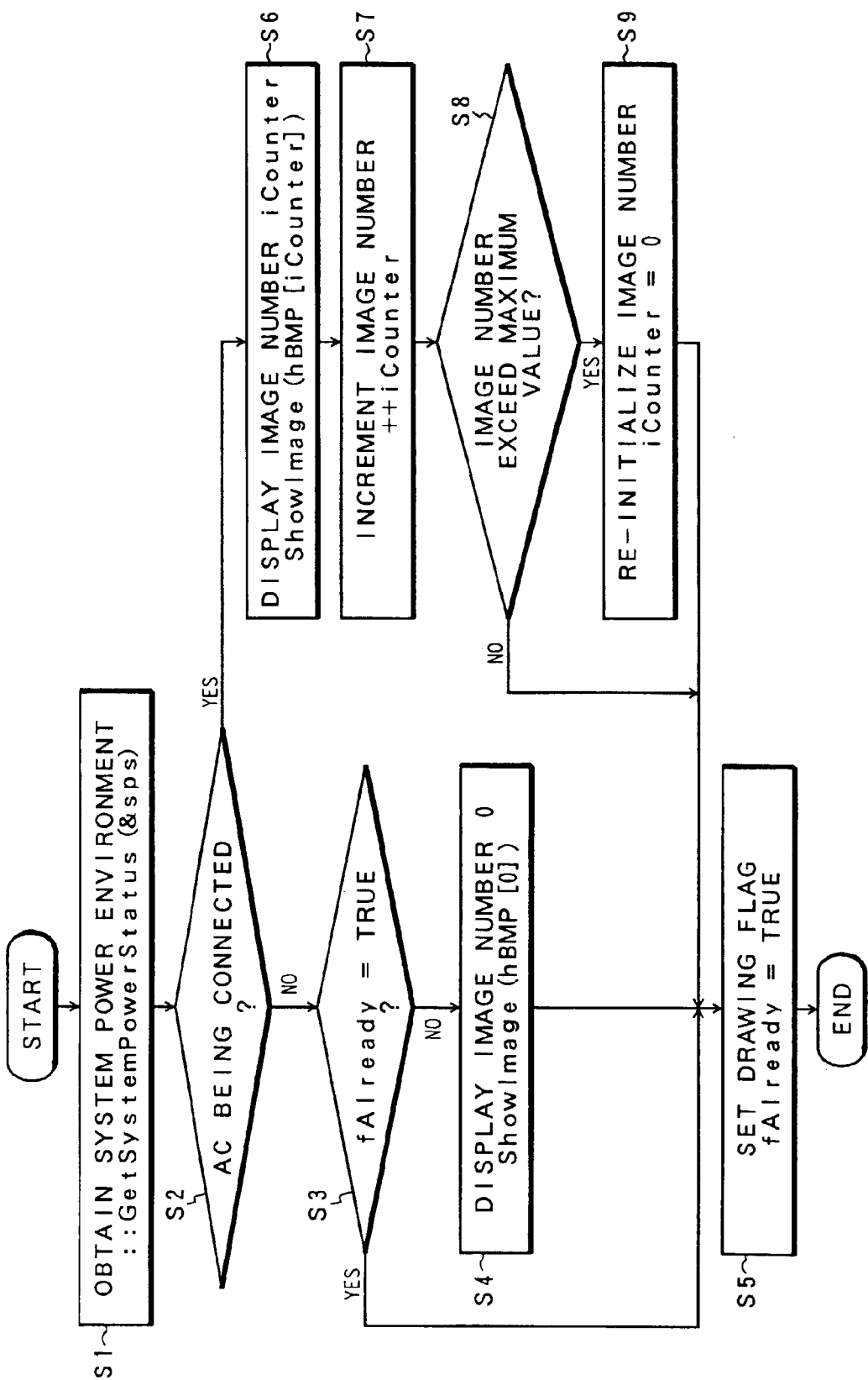

FIG. 6A

```
List.1
void sample()
{
    //-----------------------------------------
    // #a  SYSTEM POWER STATUS STORAGE AREA
    //-----------------------------------------
    SYSTEM-POWER-STATUS sps;
    //-----------------------------------------
    // #b  OBTAIN SYSTEM POWER STATUS
    //-----------------------------------------
    ::GetSystemPowerStatus( &sps );
    //-----------------------------------------
    // #c  DRAWING FLAG WHICH IS SET(INITIALIZED ONLY ONCE)
    //-----------------------------------------
    static BOOL fAlready = FALSE;
    //-----------------------------------------
    // #d  SYSTEM BEING OPERATED ON BATTERY?
    //-----------------------------------------
    if ( AC_LINE_OFFLINE! = sps.ACLineStatus ) {
        //-----------------------------------------
        // #e1  NO IMAGE DRAWN
        //-----------------------------------------
        if ( !fAlready ) {
            //-----------------------------------------
            // #e2  DRAW IMAGE
            //-----------------------------------------
            ShowImage( hBMP[0] );
            //-----------------------------------------
            // #e3  ALREADY DRAWN
            //-----------------------------------------
        } else {
```

FIG. 6B

```
                                                 //-------------------------------
                                                 //  #e4  NO OPERATION
                                                 //-------------------------------
                                            }
//------------------------------------------
//  #f1  SYSTEM BEING OPERATED ON AC ADAPTER
//------------------------------------------
} else {
        //----------------------------------------------------
        //  #f2  ANIMATION COUNTER(INITIALIZED ONLY ONCE)
        //----------------------------------------------------
        static int iCounter = 0;
        //----------------------------
        //  #f3  DRAW IMAGE
        //----------------------------
        ShowImage( hBMP[i] );
        //----------------------------------------
        //  #f4  INCREMENT ANIMATION COUNTER
        //----------------------------------------
        if ( ANIMATION_MAX < ++iCounter ) {
                //------------------------------------------------------------
                //  #f5  IF LAST IMAGE HAS BEEN DRAWN, RETURN TO THE FIRST
                //------------------------------------------------------------
                iCounter = 0;
        }
}
//----------------------------
//  #g  ALREADY DRAWN
//----------------------------
fAlready = TRUE;
return;
```

FIG. 12

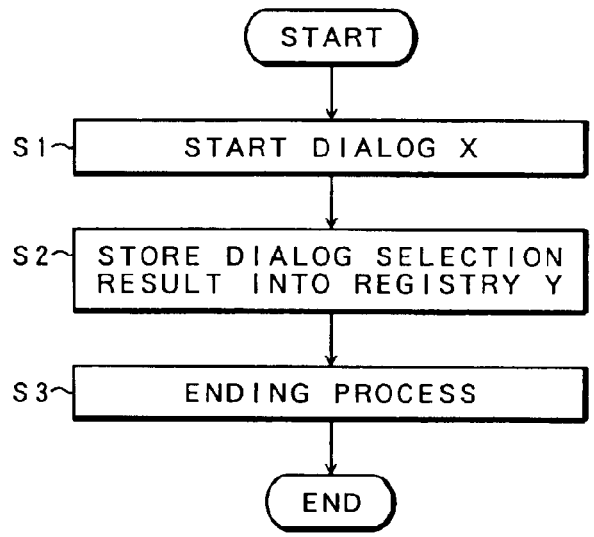

FIG. 13

```
                                                          ╱78
┌─────────────────────────────────────────────────────────┐
│ PROCESS DYNAMIC SWITCHING PROPERTY                      │
├─────────────────────────────────────────────────────────┤
│ TO ALLOW SWITCH BETWEEN PROCESS OF HEAVY LOAD           │
│ ON CPU AND PROCESS OF LIGHT LOAD ON CPU                 │
│ ACCORDING TO ENVIRONMENT, CHECK THE CHECKBOX.           │
│ IN THIS CASE, ANIMATION MAY STOP.                       │
│                                                         │
│    ☐    ALLOW SWITCH BETWEEN PROCESS OF HEAVY           │
│  80     LOAD ON CPU AND PROCESS OF LIGHT LOAD           │
│         ON CPU ACCORDING TO ENVIRONMENT.                │
│                                                         │
│                                         82~[ CLOSE ]    │
└─────────────────────────────────────────────────────────┘
```

SOFTWARE PROCESSING APPARATUS WITH A SWITCHING PROCESSING UNIT FOR DISPLAYING ANIMATION IMAGES IN AN ENVIRONMENT OPERATING BASE ON TYPE OF POWER SUPPLY

BACKGROUND OF THE INVENTION

1. Field of the Invention

The present invention relates to a software processing apparatus such as a portable notebook-size personal computer driven on a battery and a recording medium on which a computer-readable program is recorded. More particularly, the invention relates to a software processing apparatus which executes processes of software with reduced power consumption at the time of operation on a battery and a recording medium.

2. Description of the Related Arts

A notebook-size personal computer as a portable personal computer generally uses a rechargeable battery as a power supply for system operation. Since the power capacity of the rechargeable battery is limited, an operation time when the personal computer is carried is limited. Generally, a longer operation time of a portable device is requested. In the notebook-size personal computer as well, in order to increase the operation time when the computer is carried, various power saving techniques are used. Power saving by automatically adjusting an operation clock frequency of a CPU (hereinbelow, simply called a "CPU clock frequency") used as one of the power saving techniques is a technique which decreases power consumption by minimizing the CPU clock frequency depending on a processing amount requiring the CPU.

During the power saving carried out by the automatic adjustment of the CPU clock frequency is performed, the smaller the processing amount requiring the CPU, a higher power saving effect can be obtained by lowering the CPU clock. In other words, during the power saving carried out by the automatic adjustment of the CPU clock frequency, the power saving effect is higher on a process in which it is sufficient to perform an operation of drawing a still picture once, the power saving effect is higher. On the contrary, the power saving effect is lower on a process of repeating an operation of drawing an image in animation or the like. Software, however, always perform routine processes irrespective of an environment. In the case of one software, a process performed by the software is either a process of light load on which the power saving effect is high or a process of heavy load on which the power saving effect is low. It is not expected that power saving is attempted by software itself during power saving performed by automatic adjustment of the CPU clock frequency.

SUMMARY OF THE INVENTION

According to the invention, there are provided a software processing apparatus and method which determines whether an environment needs power saving or not and realizing an operation optimum to each environment by software, and a recording medium on which the program is stored.

A software processing apparatus of the invention is characterized by including: an operating environment determining unit which determines whether an operating environment requires power saving or not at the time of executing an application program such as a CPU meter; and a switching unit which performs a process of heavy load in a first environment which does not require power saving and performing a process of light load in a second environment requiring power saving. The operating environment determining unit determines a status where the apparatus operates on an external power supply as the first environment, and determines a status where the apparatus operates on a battery as the second environment. According to the invention, consequently, in the operating environment in which the apparatus operates on the external power supply and power saving is not therefore necessary, a normal process in which all of the functions of the software are valid is performed. In the operating environment in which the apparatus operates on a battery and power saving is necessary, the inherent functions of the software are simplified so as not to be lost to thereby reduce the load on the CPU. By the reduction in load on the CPU, the CPU clock frequency is lowered to the minimum of the process of light load by a function of automatically adjusting the CPU clock frequency in the state where the apparatus operates on the battery. Thus, the power consumption can be decreased.

In this case, the process of light load is a process obtained by simplifying the process of heavy load. The simplified process is a part of the process of heavy load. For example, software to which the invention is directed is an animation displaying program for sequentially, repeatedly drawing a plurality of images by being operated by a timer interruption every predetermined time. In this case, the switching unit executes the simplified process of light load obtained by making a part of the images of animation valid in the first environment requiring power saving, and performs the process of heavy load in which all of images in the animation are valid in the second environment which does not require power saving. In the animation, usually, the larger the number of drawing operations is, the heavier the load on the CPU becomes, and the power saving effect is reduced. In the invention, in the first environment requiring power saving, the drawing operation which displays only the last image of the animation is performed once to reduce the load on the CPU. Consequently, the power consumption can be further reduced also by the software during the power saving operation of automatically adjusting the CPU clock frequency. The simplified process may be a process of using data obtained by processing data used in the process of heavy load. The following is examples of the software.

(I) A program which executing floating-point operations. In the first environment requiring power saving, the switching unit 50 executes a process of relatively light load simplified by discarding the fractional portion.

(II) A moving image reproducing program. In the first environment requiring power saving, the switching unit 50 executes a process of relatively light load simplified by thinning images or lowering the resolution.

The simplified process is another process realizing the same function as that of the process of heavy load. For example, the software is a program which displays a graphical user interface. The switching unit 50 executes a process of relatively light load simplified by switching a user interface to dialogue display in an environment requiring power saving.

The apparatus also includes a setting unit which sets switching between the process of heavy load and the process of light load to be valid or invalid. For example, a property of switching a software process by an operating environment determining unit 48 and a switching unit 50 to be valid or invalid is provided. The user can select either a normal software operation or a simplified software operation for power saving as necessary. The process of heavy load and the process of light load are performed by a processor, and the processor changes an operation clock frequency in accordance with load of a process.

Further, in another mode of the invention, there is provided a software processing apparatus including: an operating environment determining unit which determines an operating environment of a system; and a switching unit which performs switching between a process of heavy load on a processor and a process of light load on the processor in accordance with the operating environment.

The invention further provides a computer-readable recording medium on which a program of a software process is recorded, in which the program to be executed by the computer includes:

determining whether an operating environment requires power saving or not;

performing a process of heavy load in a first environment which does not require power saving and performing a process of light load in a second environment requiring power saving. The details of the program are basically the same as those of the apparatus configuration.

The above and other objects, features, and advantages of the present invention will become more apparent from the following detailed description with reference to the drawings.

BRIEF DESCRIPTION OF THE DRAWINGS

FIG. 1 is a block diagram showing a hardware configuration of the invention;

FIG. 2 is a block diagram showing a mechanism configuration of the invention;

FIG. 5 is a flowchart of a processing operation of the invention performed by animation software of FIG. 1;

FIGS. 6A and 6B are diagrams which explains a program list corresponding to FIG. 5;

FIG. 12 is a flowchart of a case of setting whether the switching of the load on the CPU according to the invention is valid or invalid by a property;

FIG. 13 is a diagram which explains a property screen in which whether the switching of the load on the CPU according to FIG. 10 is valid or invalid is set.

DETAILED DESCRIPTION OF THE PREFERRED EMBODIMENTS

Figure 3A:
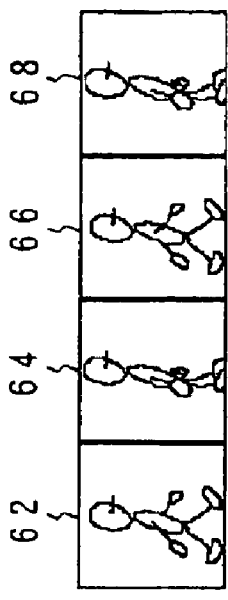
FIGS. 3A to 3C are diagrams which explains a drawing operation in an animation displaying process of the invention.

FIG. 1 is a block diagram of a hardware configuration to which the invention is applied and shows a notebook-size personal computer known as a portable personal computer as an example. The notebook-size personal computer generally operates on a rechargeable battery. An apparatus to which the invention is applied is not limited to the notebook-size personal computer but the invention can be applied to various electronic devices. To a bus 11 extended from a CPU 10, a memory 12, an HDD (Hard Disk Drive) 14 for external storage, a DSP 16, a keyboard 18, a display 22 via a display controller 20, and a modem 24 are connected. A PC card 26 having therein a modem is connected to a PC card slot 24. By connecting a portable telephone 28 via the PC card 26 serving as an interface, data communication can be carried out with the outside. A power supply unit 30 is also provided. To the power supply unit 30, an AC adapter 32 and a rechargeable battery 34 can be connected. The battery 34 is charged in an operating state where the power is supplied by the AC adapter 32. When the notebook-size personal computer is carried, it operates on the power supply unit 30 to which power is supplied from the battery 34. The power supply unit 30 is connected to the bus 11 extending from the CPU 10. Information indicative of an operating environment in which the notebook-size personal computer operates on the power supply from the AC adapter 32 and information indicative of an operating environment in which the notebook-size personal computer operates on the battery 34 can be provided to the CPU 10 side. In the memory 12 connected to the CPU 10 via the bus 11, an OS 38 and an application 36 functioning as software of the invention are loaded from the HDD 14 and developed when the power of the notebook-size personal computer is turned on. As the OS 38, for example, Windows 98 or Windows 2000 of Microsoft Corporation or the like is used. The application 36 to which the invention is directed is, for example, a CPU meter. The CPU meter is a program which monitors the load on the CPU 10 and displaying the load in a numerical value (%) or graph. Animation of the CPU meter of the invention is displayed as an accessory operation on initialization of the program. An animation displaying process on initialization of the CPU meter provided as the application 36 is performed as follows. In the invention, a check is made to see whether the apparatus operates on the battery 34 or not as the operating environment. When the apparatus operates on the battery 34, the operating environment requiring power saving is determined. The process is switched to the animation displaying process on initialization of the CPU meter and a simplified process of relatively light load is executed, thereby attempting power saving in the operating status on the battery. The operating environment in the application 36 can be determined by obtaining information indicative of an operating status in which power is supplied from the battery to the power supply unit 30 and information indicative of an operating status in which an external power is supplied by the AC adapter via an API (Application Programming Interface) 40 from the power control device driver 42 assembled in OS 38. Other than the information, the conditions (remaining quantity, charging state, and life) of the battery can be also obtained by using the API.

FIG. 2 is a block diagram showing a functional configuration of executing animation display as an accessory operation at the time of initializing the CPU meter functioning as the software of the invention. A CPU meter 44 in FIG. 2 on the CPU executed by the application 36 developed on the memory 12 has an initializing unit 46 which displays the CPU meter on the screen and an animation switching unit 50 which performs an animation displaying process as an accessory operation at the time of the initializing process by the initializing unit 46. The CPU meter 44 has an operating environment determining unit 48 which determines an operating environment depending on whether the apparatus operates on the AC adapter 32 or the battery 34. For the animation displayed at the time of initialization of the CPU meter 44, whether the apparatus operates on the AC adapter 32 or the battery 34 can be known from a power control device driver 42 of the OS 38 via the API 40. The animation switching unit 50 obtains an image used for the animation displaying process, which is stored in an image file 60 via a file driver 56 provided for the OS 38, and displays the animation on the display 22 via a display driver 58. The operating environment detecting unit 48 assembled in the initializing unit 46 of the CPU meter 44 determines whether the operating environment requires power saving or not when the process of the animation switching unit 50 is executed. Specifically, when the operating status on the battery 34 is obtained via the API 40 from the power control device driver 42, an operating environment requiring power saving (first environment) is determined. When the operating status on the AC adapter 32 is obtained from the power control device driver 42 via the API 40, the operating environment determining unit 48 determines the operating environment which does not require power saving (second environment). The result of determination of the operating environment determining unit 48 is supplied to the animation switching unit 50. When the determination result indicative of the operating environment requiring power saving based on the operating status on the battery 34 is received from the operating environment determining unit 48, the animation switching unit 50 switches the process to a process of a light load processing unit 52, and executes an animation displaying process of relatively light load on the CPU 10, which is simplified by making an image of a part of the animation valid. When the determination result of the operating environment which does not require power saving based on the operating status on the AC adapter is received from the operating environment determining unit 48, the animation switching unit 50 switches the process to the process of a heavy load processing unit 54, and executes a normal animation displaying process in which all of images prepared for animation are valid, in other words, an animation displaying process of relatively heavy load on the CPU 10.

Figure 3B:
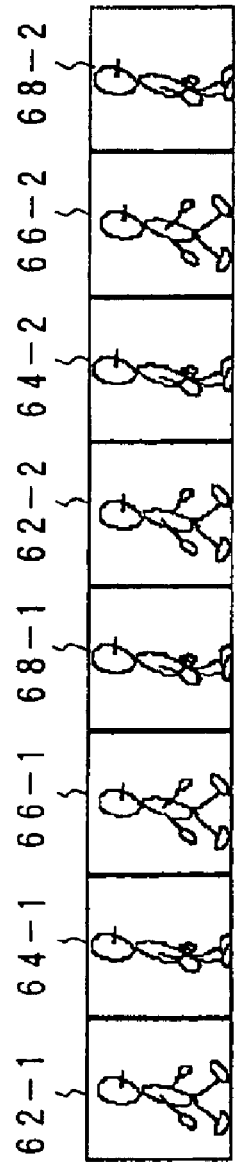
Figure 3C:
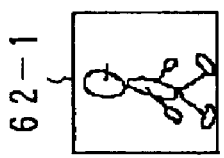

FIGS. 3A to 3C show basic images used by the animation switching unit 50 in FIG. 2, normal animation images displayed by the heavy load process, and an animation image displayed by the light load process for power saving, respectively. FIG. 3A shows the basic images used for the animation displaying process. In the example, four basic images 62, 64, 66, and 68 are prepared. The basic images 62, 64, 66, and 68 are used to generate animation showing a state where a character walks. FIG. 3B shows animation using the four basic images 62, 64, 66, and 68 in FIG. 3A displayed when the unit is switched to the heavy load processing unit 54 by the animation switching unit 50 in FIG. 2. The animation displayed by the heavy load process is constructed by eight animation images 62-1, 64-1, 66-1, 68-1, 62-2, 64-2, 66-2, and 68-2 obtained by sequentially displaying the four basic images 62, 64, 66, and 68 in FIG. 3A twice. Further, FIG. 3C shows a still image displayed by the light load process in the animation switching unit 50 in FIG. 2. In this case, only the head basic image 62 among the basic images in FIG. 3A is displayed as a still image 62-1. obviously, an arbitrary one of the basic images can be used as a still image displayed by the light load process. The last image 68 indicating the end of the animation may be also used.

Figure 4:
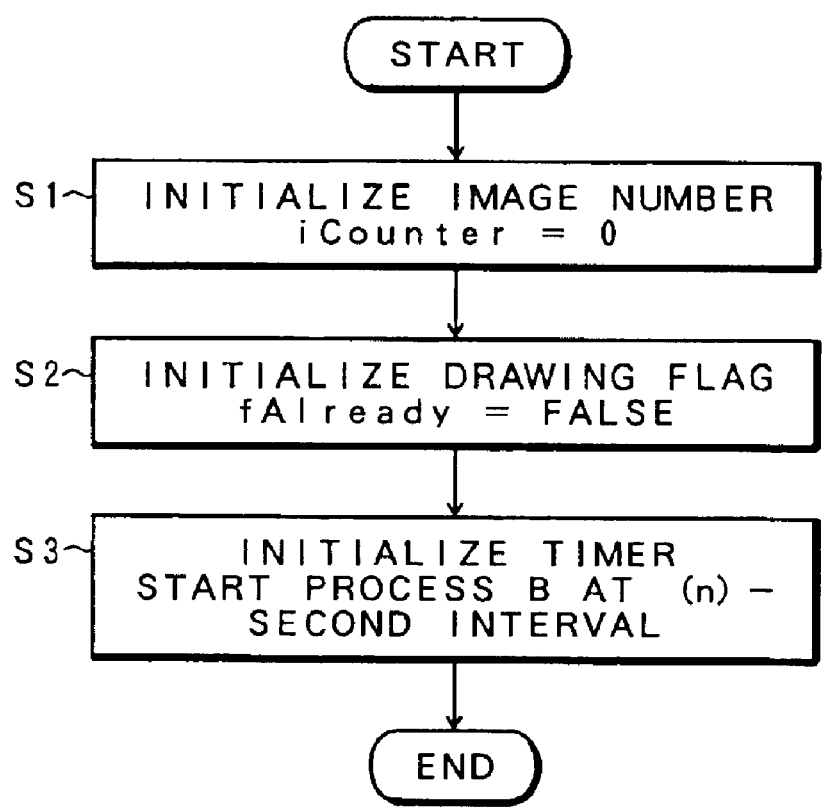
FIG. 4 is a flowchart of a process of initializing parameters used for the animation displaying process of the invention.
Figure 7A:
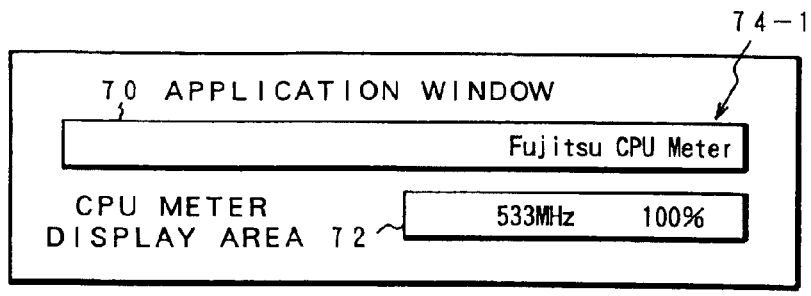
FIG. 7 is a diagram which explains a normal drawing operation of heavy load on a CPU in an environment where copyright indication is scrolled on a screen and power saving of the invention is unnecessary.
Figure 7B:
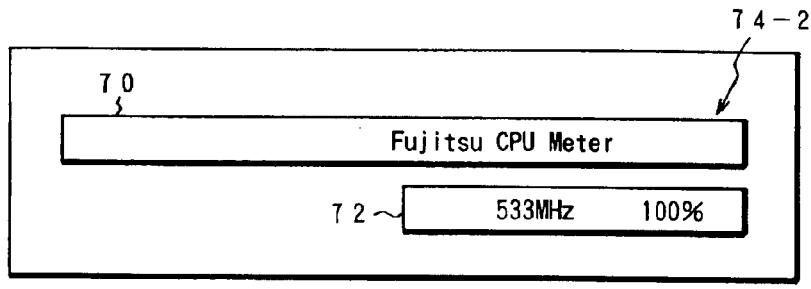
Figure 7C:
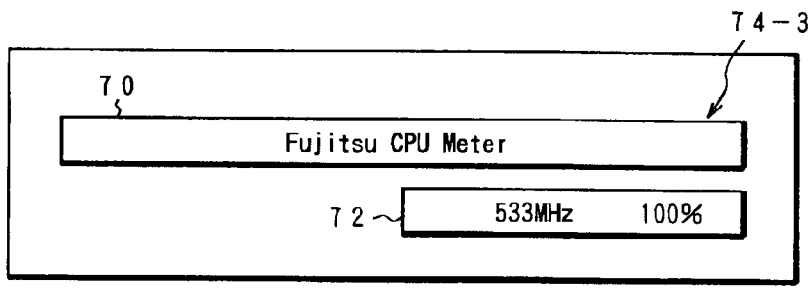
Figure 7D:
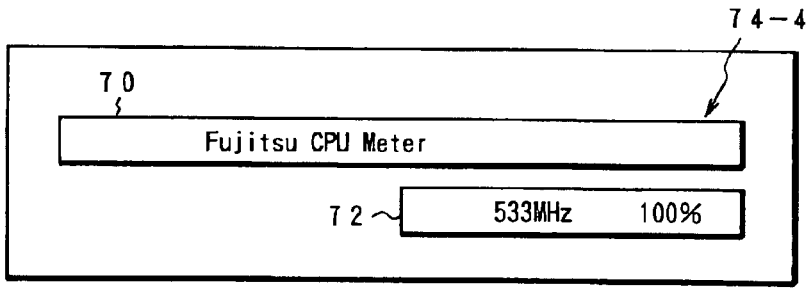
Figure 7E:
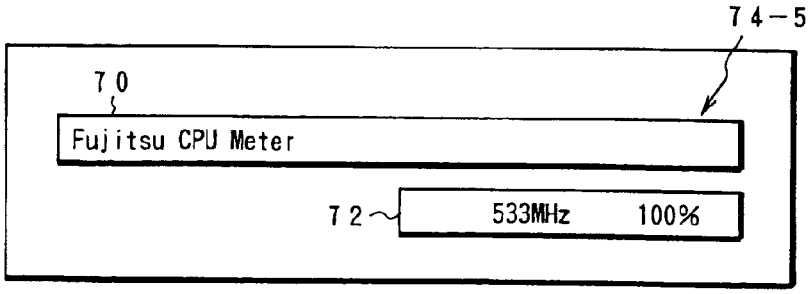

FIG. 4 is a flowchart of a process performed by the initializing unit 46 in the CPU meter 44 in FIG. 2. In the initializing process of the CPU meter 44, parameters necessary which displays animation by the animation switching unit 50 are initialized. First, image number is initialized in step S1. Since the image number is defined as "icounter" in the program list in FIGS. 6A and 6B, it is initialized to "0". In step S2, a drawing flag is initialized. The drawing flag is defined as "fAlready" in the program list in FIGS. 6A and 6B. Since the basic images are displayed twice, the drawing flag is initialized to "FALSE". In step S3, a timer which determines the intervals at which each of images of the animation is drawn is initialized. The timer is initialized so that the animation displaying process is started every (n) seconds. As the time interval (n), for example, a value on the unit of millisecond is used. By the initializing process of the CPU meter in FIG. 4, the animation displaying process as an accessory operation performed at the time of the CPU meter initializing process by the operating environment determining unit 48 and the animation switching unit 50 in FIG. 2 is executed according to the flowchart of FIG. 5 by a timer interruption of every (n) seconds set in step S3.

In FIG. 5, the animation displaying process of the CPU meter is performed in such a manner that, first, the system power environment is obtained in step S1. Specifically, the operating environment determining unit 48 detects whether the apparatus operates on the battery 34 in the power supply unit 30 at this time or not from the power control device driver 42 via the API 40. Subsequently, in step S2, whether or not the AC adapter 32 is connected and the external power is supplied from the AC adapter 32 is checked. When the apparatus does not operate on the AC adapter 32, the apparatus operates on the battery 34. The program therefore advances to step S3 where the drawing flag "fAlready" is checked. Since the drawing flag is set to "FALSE" indicating that the basic images are displayed twice in step S2 in FIG. 4, not "TRUE" indicating that the drawing has been finished, the program advances to step S4 where an image of image number 0 initialized in step S1 in FIG. 4 is selected among a plurality of prepared animation images and is displayed. In step S5, "TRUE" indicating that the drawing is finished is set to the drawing flag, and a simplified animation process performed with light load in the battery operation is finished once. Subsequently, when the process of FIGS. 6A and 6B is started by the timer interruption after (n) seconds of the timer initialized in step S3 in FIG. 4, the processes in step S1, S2, and S3 are similarly performed. Since the drawing flag is set to "TRUE" by the process of the first time, the display of the image number 0 in step S4 is skipped, and the process is finished via step S5. As a result, in the case of the system power environment where the apparatus operates on the battery, the still image of image number 0 is just displayed at the time of the animation displaying process of the CPU meter of the first time. No image is drawn at timer interruptions after that. Since it is sufficient to perform the drawing process in step S4 once, the burden on the CPU 10 in the animation displaying process is largely lessened in the operating status on the battery, so that the power consumption can be reduced. Specifically, in the operating status on the battery 34, the power saving process by the automatic adjustment of the CPU clock frequency is executed on the basis of a process by another application. In the power saving process by the automatic adjustment of the CPU clock frequency, the CPU clock frequency is lowered to the minimum in accordance with the processing amount requested to the CPU 10, thereby decreasing the power consumption. In the operating status on the battery 34, therefore, in the animation display process of the CPU meter in FIG. 5, the image drawing operation is performed only once by the timer interruption. As a result, the processing amount requested to the CPU 10 is reduced, and the clock frequency is lowered to the minimum by the CPU clock frequency automatic adjusting function, so that the power consumption can be reduced. On the other hand, in the case of the operating status on the AC adapter 32 in step S2, since it is the operating environment which does not require power saving, the normal animation displaying process is executed in steps S6 to S9. In the normal animation displaying process, in step S6, an image having image number "iCounter" initialized in step S1 in FIG. 4 is displayed. In step S7, the image number is incremented by one. In step S8, a check is made to see whether the image number exceeds the predetermined maximum number or not. When the image number does not exceed the maximum number, in step S5, the drawing flag is set to "TRUE" indicating that the drawing is finished, and the program waits for the next timer interruption in (n) seconds. By repeating the steps S1, S2, S6 to S8, and S5 performed by the timer interruption, the images are drawn, for example, in accordance with the order as shown in FIG. 3B, and the animation is displayed. When the image number exceeds the preset maximum number in step S8 during the animation displaying process, the program advances to step S9 where the image number is initialized again to "0". By repeating the processes performed by the timer interruption with the maximum image number, the animation is displayed.

FIGS. 6A and 6B are explanatory diagrams of a program list realizing the animation displaying process at the time of initialization in the CPU meter in FIG. 5. In the program list, #a(SPS) indicates an area which stores the system power status, #b indicates capture of the system power status, and #c(fAlready) indicates a flag for an internal process. In #d, the function of the operating environment determining unit 48 which determines the system power status is realized. In #e1 to #e4, the light load processing unit 52 which executes the simplified animation process is realized. In #f1 to #f5, the animation displaying process in the normal time is performed. When it is seen from the CPU 10, the heavy load processing unit 54 is realized. Further, in #g, a flag setting process for the internal process is performed. The program list realizes the operation in which the image displaying process of which load on the CPU is considered to be very high is minimized during the operation on the battery. In the list, a function "ShowImage" called in #e2 and #f3 is a function which draws an image on the screen. It can be said that, the more frequently the drawing process is called, the higher the load on the CPU 10 is. By periodically calling a routine "sample" provided by the program list by using a timer initialized in the initializing process of FIG. 4 or the like, a pattern of images of image numbers hBMP[0] to [ANIMATION MAX-1] is displayed in animation at the time of operation on the AC adapter. At the time of operation on the battery, the animation is stopped and one pattern of the animation displayed last is continuously displayed. In the routine, #a indicates a variable which is assured in the memory area on start of the program operation. #c is also a variable which is assured in the memory area at the start of the program and is initialized only once to "FALSE (not drawn)". f2(iCounter) is a static variable which is assured in a memory area on start of the program and initialized only once by the initializing process in FIG. 5. In the initialization, the image of the head image number is designated.

The processes of the program list of FIGS. 6A and 6B will be described as follows. When the routine "sample" is called by a timer or the like, the variable #a is assured in a stack area. The system power status is stored in the variable #a by the API which executes the system power status obtaining process #b. By a decision statement #d, when the system operates on battery, the process is shifted to a decision statement #e1. When the system operates on the AC adapter, the process is shifted to a decision statement #f1. The decision statement #e1 to which the process is shifted when the system operates on the battery is a statement to determine whether no image is drawn or not. In the case of "FALSE (not drawn)" for the decision statement #e1, the process is shifted to #e2 where the head image hBMP[0] of the animation is drawn by "ShowImage". On the other hand, in the case if "TRUE (drawn)" to the statement #e1, the process shifts to #e3. Since the image has been already drawn, the process shifts to #e4 and no drawing process is performed. When the processes are finished, the process shifts to #g. By such processes of #e1 to #e4, although the head image of the animation is drawn for the first time, the image is not updated for the subsequent calls, and the still image is continuously displayed. On the other hand, when it is determined by the decision statement #d that the system operates on the AC adapter and the process shifts to #f1, the process automatically shifts to #f3. In #f3, "the n-th image" according to the value of the animation counter in #f2 is drawn. Subsequently, the process shifts to #f4 where the animation counter of #f2 is incremented by one, thereby indicating an image to be drawn next, and the animation counter value is compared with the maximum value of the animation counter of #f2. When the value of the animation counter exceeds the maximum value, the process shifts to #f5 where 0 indicative of the head image is set in the animation counter of #f2. As a result, by #f1 to #f5 in the operation on the AC adapter, images are displayed in accordance with the order of 0, 1, . . . , maximum value, 0, 1, . . . , maximum value, . . . , thereby generating animation of the images. In the last #g, "TRUE" is set in the drawing flag of the variable #c, and it is stored that the images are already displayed.

FIGS. 7A to 7E show an example of animation generated by the accessory operation at the time of initialization of the CPU meter, which is displayed in the operation on the AC adapter of #f1 to #f5 in FIG. 6B. In the animation at the time of initialization of the CPU meter, images are displayed repeatedly in animation in accordance with the order of FIGS. 7A to 7E. An application window 70 is displayed in an upper part in the screen of FIG. 7A and a CPU meter 72 is displayed below the application window 70. On initialization of the CPU meter, as sequentially shown in FIGS. 7A to 7E, characters of the copyright indication of "FUJITSU CPU Meter" are displayed in animation so as to move from the right side of the application window 70 to the left side as shown by copyright indication 74-1 to 74-5.

Figure 8:
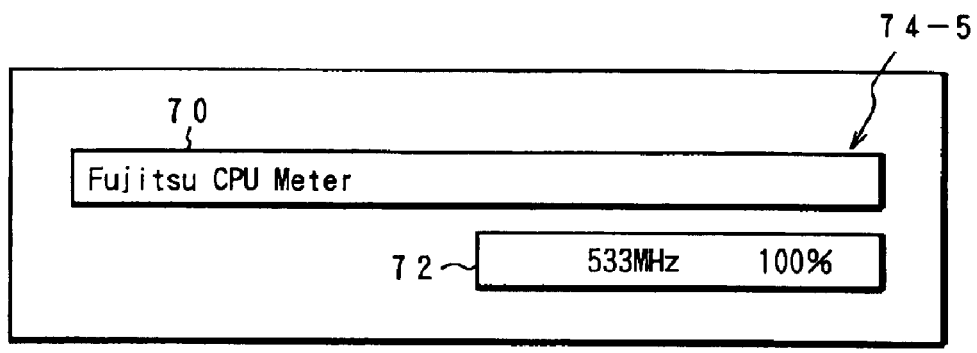
FIG. 8 is a diagram which explains a drawing operation of light load on the CPU in an environment where a still image of the copyright indication is displayed on the screen and power saving of the invention is necessary.

FIG. 8 shows a case where a still image of which load on the CPU is light is displayed by #e1 to #e4 in the program list from the animation on initialization of the CPU meter of FIGS. 7A to 7E. On displaying initialization process of the CPU meter in the operating status on the battery in FIG. 8, the still image of the copyright indication 74-5 as the last one of the images of FIGS. 7A to 7E is displayed, in which the characters are at the left side in the application window 70 above the CPU meter indication 72. In the description using FIGS. 4 to 7, in the operating status on the battery, it is set to display the image indicated by the array element number of 0, that is, the head image in the animation displayed when the system operates on the external power source supplied from the AC adapter 32.

In the example, however, in order to display the image of FIG. 8, as an image to be displayed in the operating status on the battery in the flowchart of FIG. 5 and the program lists of FIGS. 6A and 6B, it is set to display the last image of the animation, which is indicated by the last array element number.

Figure 9A:
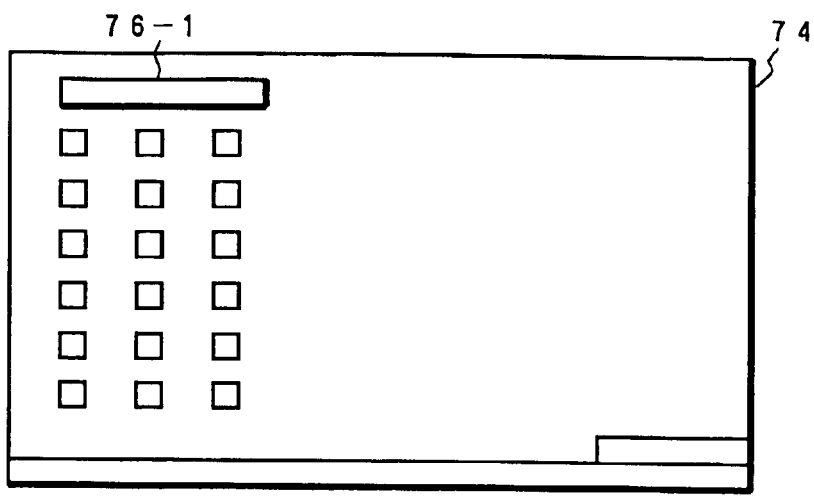
FIGS. 9A to 9C are diagrams which explains a normal drawing operation of heavy load on the CPU in an environment where an application window moves on the screen and power saving of the invention is unnecessary.
Figure 9B:
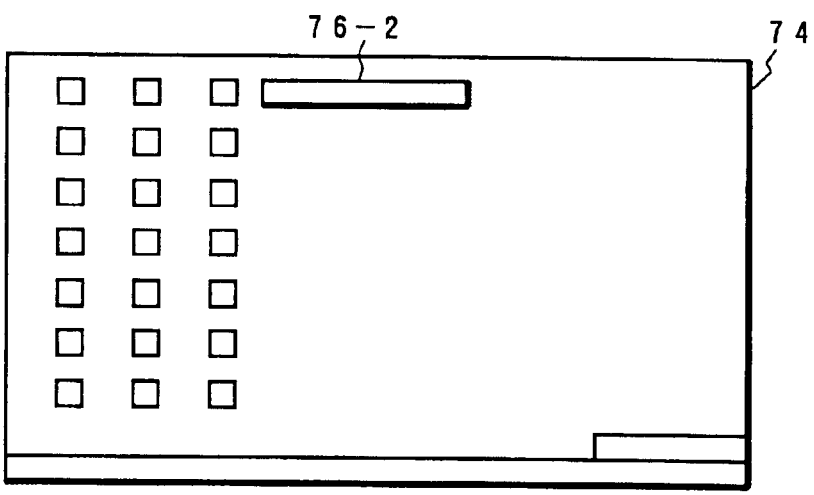
Figure 9C:
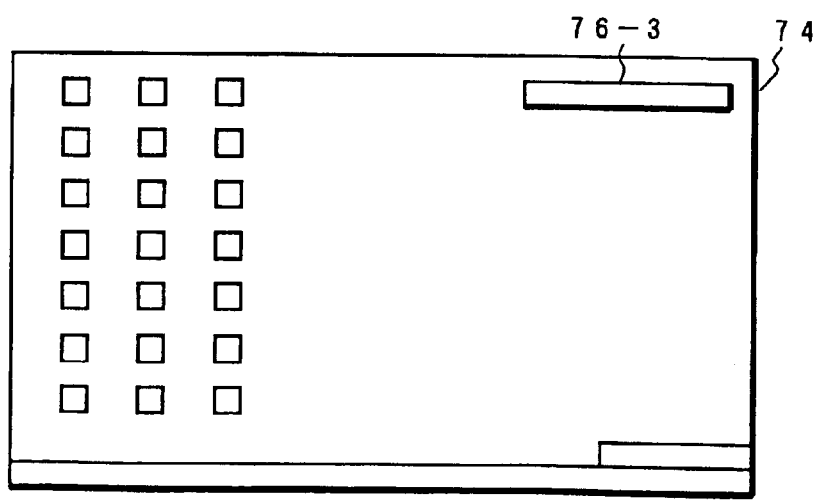
Figure 10:
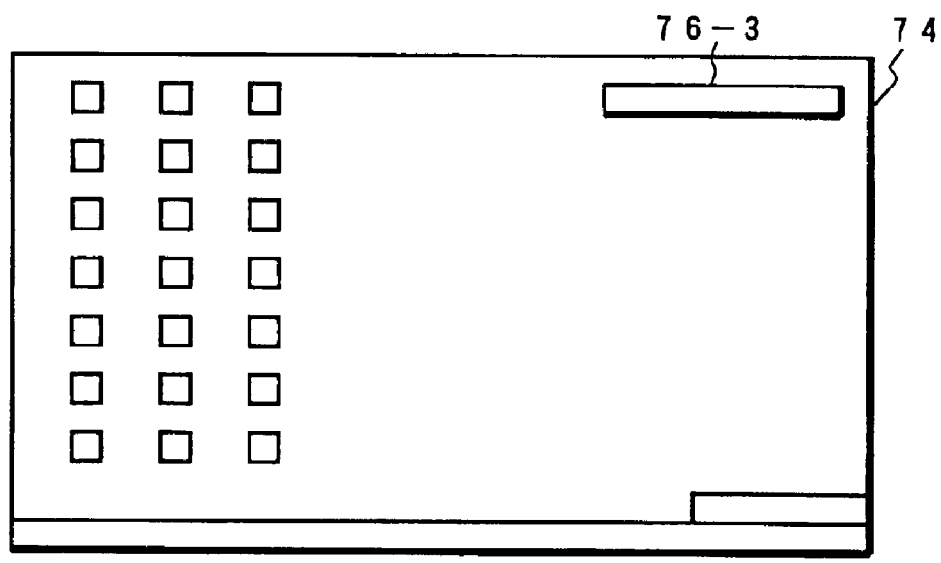
FIG. 10 is a diagram which explains a drawing operation of light load on the CPU in an environment where a still image of the application window is displayed on the screen and power saving of the invention is necessary.

FIGS. 9A to 9C show another example of animation display at the time of the CPU meter initializing process in the invention. In this case, as shown in FIGS. 9A, 9B, and 9C, a CPU meter window 76-1 displayed in the left upper corner of a screen 75 of Windows is shifted in animation to the right side across the screen as shown by CPU meter windows 76-2 and 76-3 in FIGS. 9B and 9C with elapse of time. In each of the CPU windows 76-1 to 76-3, a CPU meter similar to that in FIG. 8 is displayed. Although plural image data used for animation display is defined by the array hBMP in FIGS. 3 to 8, in the example, coordinate information which displays a CPU meter window is defined by using the array hBMP. At the time of the displaying process by "ShowImage", the CPU meter window is displayed on the coordinates indicated by the designated element numbers of the array hBMP. By the operations, the animation that the window moves can be realized. As such animation that the CPU meter window 76-1 crosses the screen in FIGS. 9A to 9C, in the operating status on the battery, as shown in FIG. 10, the CPU meter window 76-3 is continuously displayed in the state of FIG. 9C in which the CPU meter window 76-3 is in the last display position of the animation. In this case as well, in a manner similar to the examples of FIGS. 7A to 7C and FIGS. 9A to 9C, when the system operates on the battery, it is set to display the window, not in the coordinate position indicated by the first element number of the array hBMP, but in the coordinate position indicated by the last element number of the array hBMP.

Figure 11:
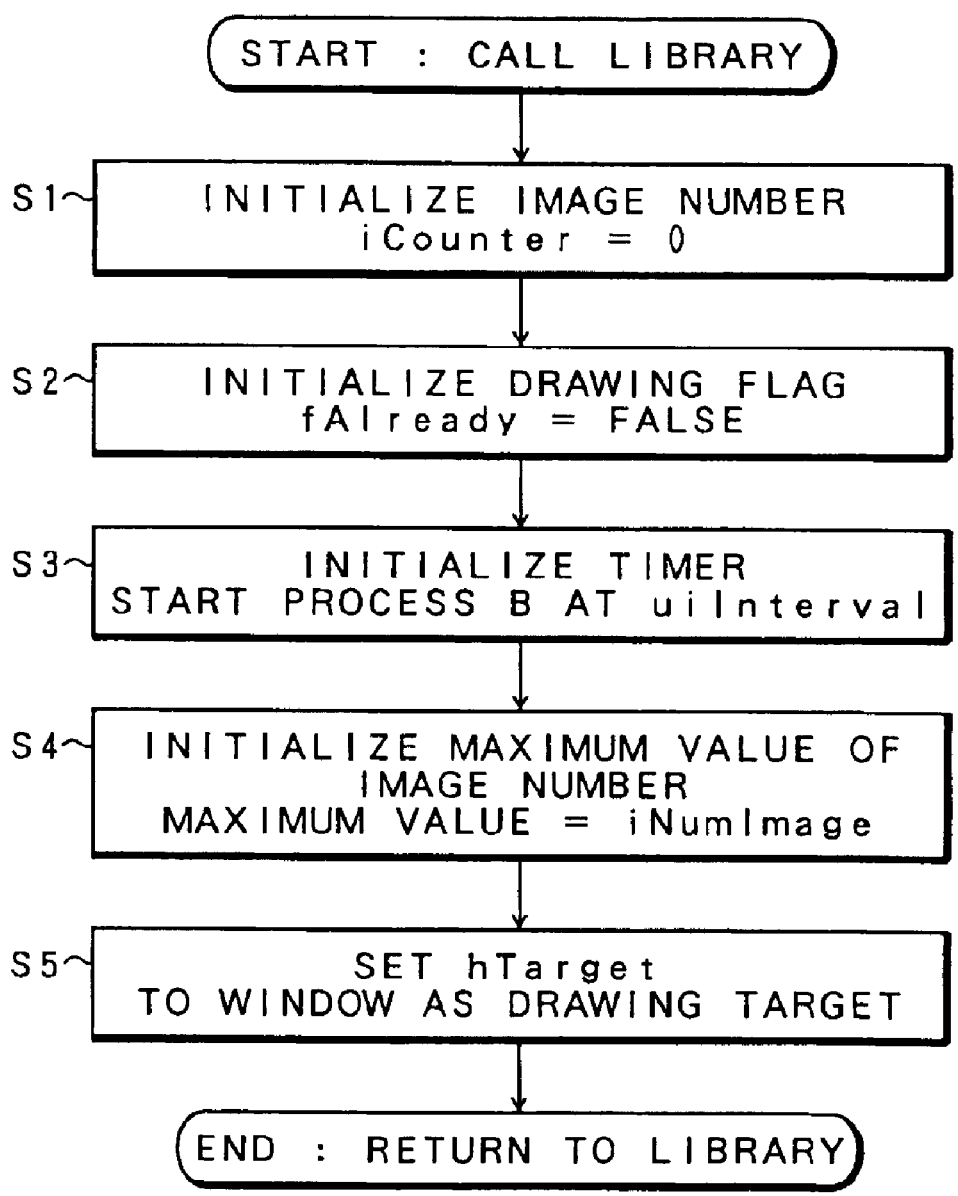
FIG. 11 is a flowchart of a case of storing a process of initializing parameters of animation software of the invention into a library.

FIG. 11 shows a flowchart of a processing operation in a library when the animation display at the time of the CPU meter initializing process is stored in the library. Specifically, the CPU meter animation displaying processes in FIGS. 4 and 5, and FIGS. 7A to 7E are performed by, as an example, the application including the animation displaying process. In FIG. 11, the CPU meter initializing process is stored in a library, and the animation displaying process is performed in the initializing process. Specifically, a control of performing the switching between the operation on the battery and the operation on the external power source can be commonly used by applications. In the case of storing the CPU meter initializing process in a library, in order to binary-code parameters for the animation display stored in the library for the animation display of the CPU meter initializing process, the following API (Application Programming Interface) is defined.

void EcoAnimation(HWND hparent, HWND hTarget, HBITMAP hBMP, int iNumImage, UNIT uiinterval)
where,
   HWND hparent: window handle of a parent window
   HWND hTarget: window handle of a target window which displays animation
   HBITMAP hBMP: pointer to the array of images to be displayed in animation int iNumImage: the number of images to be displayed in animation
   UNIT uiInerval: animation interval (unit: ms)

In the case of storing the CPU meter initializing process in a library, the initializing process of FIG. 11 is executed in response to a call of the API defined as above. In the initializing process of FIG. 11, the image number is initialized in step S1, a drawing flag is initialized in step S2, and the timer is initialized in step S3. The initialization in steps S1 to S3 is the same as that including the animation displaying process in FIG. 5. In the initializing process in the library, further, the maximum value of the image number is initialized in step S5, and a target window on which an image is to be drawn is set to "hTarget" showing an image pattern. After that, the process returns to the library. By the initializing process stored in the library, the CPU meter animation displaying process of FIG. 6 is started by the timer interruption every predetermined time set in the timer initialization in step S3. In accordance with the parameters set in the initializing process, either a still image at the time of the operation on the battery or regular animation at the time of the operation on the AC adapter is displayed.

FIG. 12 shows a flowchart of a process of selectively setting the property of switching the animation display at the time of the CPU meter initializing process in the invention to the still image display when the system operates on the battery. Specifically, in order to allow the user to select whether the power saving by displaying a still image in the operating status on the battery is made valid or not by user setting with respect to the animation displayed on initialization of the CPU meter according to the invention, a flow of property switching operation of FIG. 12 is prepared. The validity/invalidity of the animation display according to the operating environment by the property is switched by, first in step S1, starting a dialog X, storing a dialog selection result into a registry Y in step S2, and performing an ending process in step S3.

FIG. 13 shows a property displaying screen accompanying the property switching process operation in FIG. 12. Specifically, when the dialog X is started in step S1 in FIG. 12, a property screen 78 which dynamically switches the process is displayed. In order to make the dynamic switch valid, it is sufficient to click a check box by using a mouse and set the switch by clicking a "close" button 82.

The registry Y in step S2 in FIG. 12 is a setting information storing area on the hard disk of the OS. In the OS of the Windows series of Microsoft Corporation, generally, the setting regarding software is stored in the registry. The registry has a hierarchical structure like the file system, and specific information is identified by a registry key (corresponding to a path/file name in the file system). The following can be used as a registry key to which the user setting of switching the property in FIG. 12 is stored.
HMY CURRENT
USER¥Software¥Fujitsu¥EcoAnimation¥Action
where, when the value of "Action" is 0, operation switching according to the environment is not performed. When the value of "Action" is 1, operation switching according to the environment is performed.

Figure 14:
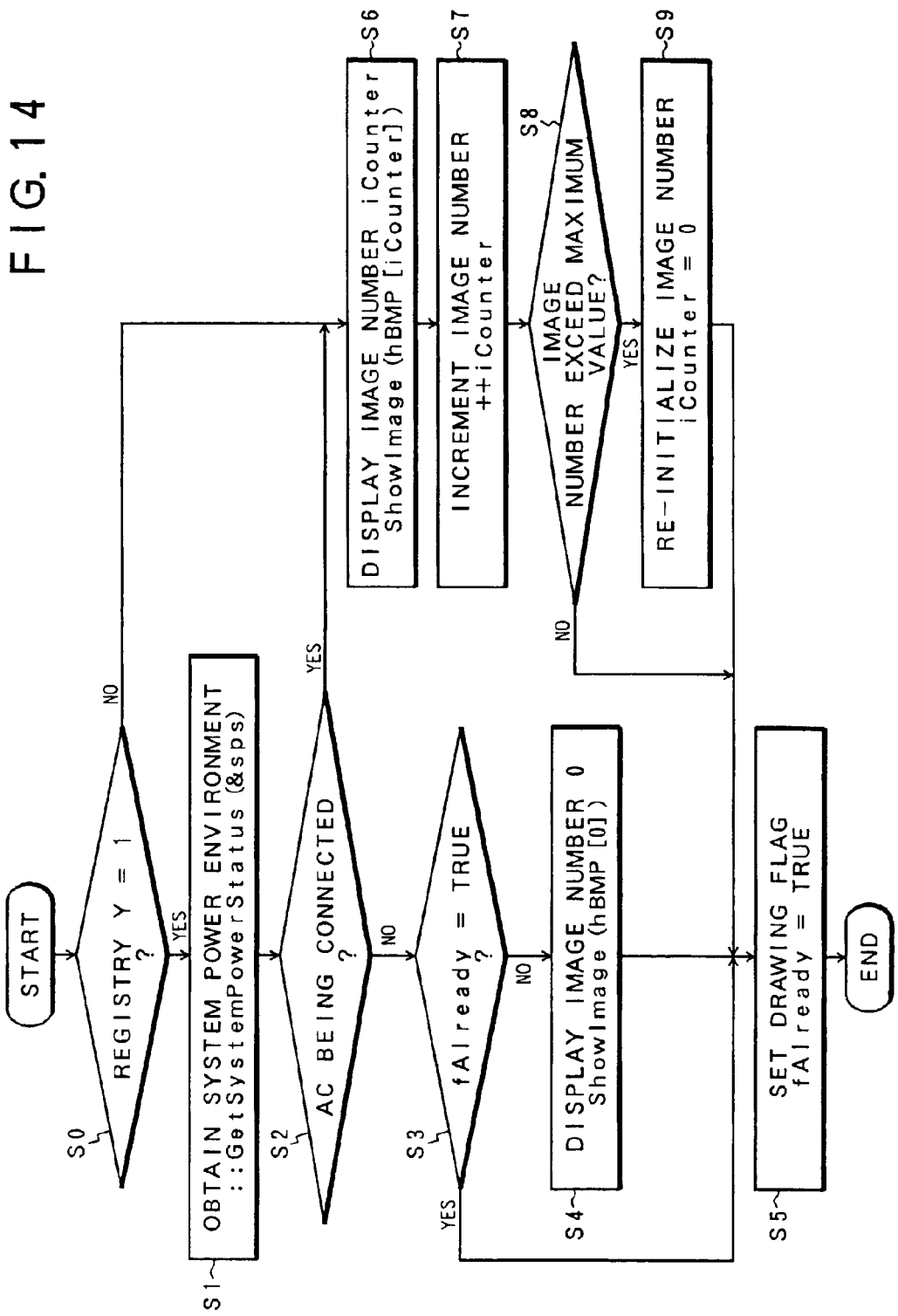
FIG. 14 is a flowchart of an animation displaying software process of the invention in accordance with data in a registry set by using the property screen of FIG. 11.

FIG. 14 shows a flowchart of an animation displaying process in the CPU initializing process in the case where the user selectively sets the dynamic process switching by the property as shown in FIGS. 12 and 13. The flowchart includes a routine of checking the registry as step S0 prior to steps S1 to S9 in the flowchart of the animation displaying process of FIG. 5. In step S0, when "1" is set in the registry Y, the operation switching according to the system environment is performed, so that the program advances to the processes in step S1 and subsequent steps. On the other hand, when "0" is set in the registry Y, the operation switching according to the system environment is not performed, so that the program advances to the process in step S6.

The foregoing embodiment has been described by, as an example, the switching between the process of light load on the CPU and the process of heavy load on the CPU in accordance with the system operating environment in the animation displaying process as an accessory operation in the CPU meter initializing process. The invention is not limited to the foregoing embodiment but can be applied to an appropriate apparatus and software. In the foregoing embodiment, when the system operates on the battery, the operating environment is determined as that requiring power saving. When the system operates on the external power source, the operating environment is determined as the environment which does not require power saving. The invention is not limited to the foregoing arrangement. For example, it is also possible to define the state where the remaining amount of charges in the battery is small as an operating environment requiring power saving, define the state where the remaining amount of charges in the battery is large as an operating environment which does not require power saving, determine the operating environment on the basis of the definition while the apparatus operates on the battery, and perform the switching between the process of light load and the process of heavy load on the basis of the determination result. The remaining amount of charges in the battery can be obtained by the above-described API or other known techniques.

In an apparatus having two operation modes of a normal mode and a power saving mode, irrespective of the kind of the operation power source or the remaining amount of charges in the battery, it is also possible to define the state where an operation in the normal mode is instructed as the operating environment which does not require power saving, define the state where an operation in the power saving mode is instructed as the operating environment requiring power saving, and perform the switching between the process of light load and the process of heavy load on the basis of the operation mode designated by the user. The operation mode can be obtained by known techniques. For example, it is obtained from management information of the operating system. That is, according to the invention, it is sufficient to define two relative states of a state in which power saving is necessary and a state in which power saving is unnecessary, determine whether the present state corresponds which one of the states, and switch the process to be executed according to the determination result. Software to which the invention is directed, which switches the process to be executed between the process of heavy load and the process of light load depending on whether the operating environment requires power saving for the CPU or not includes the following as examples.

(I) A program which executes floating-point operations. In the environment in which power saving is not necessary, the floating-point operation including the fractional portion is executed. On the other hand, in the environment requiring power saving, a process of relatively light load simplified by discarding the fractional portion and by using integers is executed.

(II) A moving image reproducing program. In the environment in which power saving is not necessary, a switching unit reproduces all of moving images as smooth reproduction images as in television. On the other hand, in the environment requiring power saving, a thinning process of thinning moving images so as not to be conspicuous or a process of relatively light load simplified by lowering the resolution is executed.

(III) A program which displays, for example, the "help" function as a graphical user interface such as a dolphin in "Word" of Microsoft Corporation. In the environment in which power saving is not necessary, a switching unit displays a graphical user interface. In the environment requiring power saving, the user interface is switched to a simple user interface. For example, a process of relatively light load simplified by switching "help" to an ordinary dialog display is executed.

Obviously, the invention can be adapted not only to the above but also to an appropriate process which reduces load on the CPU by switching the function in the environment in which power saving is unnecessary to a part of the function or a simplified function in the environment requiring power saving in the same application.

As an example of a computer-readable recording medium in which a program which performs the switching between a process of heavy load and a process of light load in accordance with the operating environment of the invention, the program is generated as an application program, library, or other control program which runs on a computer having the configuration of FIG. 1. Such a program realizing the function of the invention is stored in a portable storage medium such as CD-ROM, floppy disk, DVD, magnetooptic disk, or IC card. Alternately, the program is installed from a database or other computer system by using a modem or LAN interface via a network. The installed program of the invention is loaded to a computer system, stored in the hard disk drive (HDD), and executed by a CPU by using an RAM or the like.

According to the invention as described above, in the operating status in which the external power is supplied from the AC adapter and power saving is therefore unnecessary, a process of heavy load on the CPU as an inherent processing function, for example, display of animation is executed. In the operating status on the battery, which requires power saving, a simplified process, for example, display of only a still image is performed. Consequently, the load on the CPU is reduced in the operation time in which power saving is necessary. As a result, a period in which the CPU clock frequency is lowered by the CPU clock frequency automatic adjustment becomes longer. By the reduction in the load on the CPU in accordance with the operating environment of dynamic power saving in such software, the operating time of displaying an image of a portable device using a rechargeable battery such as a notebook-sized personal computer can be increased.

The invention includes appropriate modifications having the same object and advantages and is not limited to numerical values presented in the foregoing embodiment.

What is claimed is:

1. A software processing apparatus which performs a prescribed program processing, comprising:
   an operating environment determining unit which determines whether an operating environment requires power saving or not; and
   a switching processing unit which performs a process of heavy load which causes said program processing to be performed as it is in a first environment which operates by an external power supply and does not require power saving and performs a process of light load in which said program processing is simplified in a second environment operating by a battery and requiring cower saving, and
   wherein said switching processing unit performs an animation for all images in an environment operating by said external power supply, in the case of an animation in which said program processing sequentially and repeatedly draws a plurality of images, and displays only one prescribed image in the animation in an environment operating by a battery.

2. An apparatus according to claim 1, further comprising a setting unit setting the switching between said process of heavy load and said process of light load to be valid or invalid.

3. An apparatus according to claim 1, wherein said process of heavy load and said process of light load are performed by a processor, and said processor changes an operation clock frequency in accordance with load of a process.

4. A software processing method which performs a prescribed program processing, comprising:
   determining whether an environment requires power saving or not;
   performing a process of heavy load for which causes said program processing to be performed as it is in a first environment which operates by an external cower supply and does not require power saving and performing a process of light load in which said program processing is simplified in a second environment operating by a battery and requiring power saving; and
   in a case of an animation in which said program processing sequentially and repeatedly draws a plurality of images, performing animation for all the images in an environment operating by an external power supply, and displaying only the last image of animation in an environment operating by a battery.

5. A method according to claim 4, wherein switching between said process of heavy load and said process of light load is performed on the basis of valid/invalid setting information.

6. A method according to claim 4, wherein said process of heavy load and said process of light load are performed by a processor, and said processor changes an operation clock frequency in accordance with load of a process.

7. A recording medium on which a program to be executed by a computer to perform a prescribed program processing,
   wherein said program causes execution of:
   an operating environment determining operation determining whether an operating environment requires power saving or not;
   a switching processing operation which performs a processing of high load which causes performance of said program processing as it is in a first environment which operates by an external power supply, and does not required power saving, and performances of a processing of low load which simplifies said program processing in a second environment operating by a battery and requiring power saving; and
   wherein said switching processing operation performs, in the case of an animation which draws sequentially and repeatedly a plurality of images in said program processing, in an environment which operates by the external power supply, and displays only the last image of animation in an environment operating by the battery.

8. A recording medium according to claim 7, wherein said switching operation performs switching between said process of heavy load and said process of light load on the basis of setting valid/invalid information.

9. A recording medium according to claim 7, wherein said process of heavy load and said process of light load are performed by a processor of said computer, and said processor changes an operation clock frequency in accordance with load of a process.

10. A recording medium according to claim 7, wherein said program is commonly used by other program and performs switching between said process of heavy load and said process of light load in response to a notification from the other program.

11. A recording medium according to claim 10, wherein said program determines the contents of said process of heavy load and the contents of said process of light load in accordance with the contents included in the notification from said other program.

12. A recording medium on which a program to be executed by a computer is recorded, wherein said program includes:
   an operating environment determining operation determining whether an operating environment requires power saving or not; and
   a switching operation performing a process of heavy load for a CPU in a first environment which does not require power saving and performing a process of light load in a second environment requiring power saving, and
   wherein the light load process performed is responsive to the heavy load process where for an animation heavy load process one of light processing a last image, thinning images or producing images of a lower resolution is performed, for a floating point arithmetic heavy load process a light load process ignoring fractional numbers parts is performed, and for a graphical user interface heavy load process a light load process of a dialog display is performed.

13. A method of processing, comprising:
   determining whether a CPU performing processing is operating in a battery mode; and
   automatically reducing an operation load on the CPU when the processing is operating in the battery mode, and
   wherein a light load process performed is responsive to a heavy load process during the reducing where for an animation heavy load process one of light processing a last image, thinning images or producing images of a lower resolution is performed, for a floating point arithmetic heavy load process a light load process ignoring fractional numbers parts is performed, and for a graphical user interface heavy load process a light load process of a dialog display is performed.

14. A method of processing, comprising:
   determining whether a CPU performing processing is operating in a battery mode; and
   automatically reducing an operation load on the CPU when the processing is operating in the battery mode; and
   wherein a light load process performed is responsive to operation load of a heavy load process where for an animation heavy load process one of light processing a last image, thinning images or producing images of a lower resolution is performed, for a floating point arithmetic heavy load process a light load process ignoring fractional numbers parts is performed, and for a graphical user interface heavy load process a light load process of a dialog display is performed.

15. A software processing apparatus which performs a prescribed program processing, comprising:
   an operating environment determining unit which determines whether an operating environment requires power saving or not; and a switching processing unit which performs a process of heavy load which causes said program processing to be performed as it is in a first environment which operates by an external power supply and does not require power saving and performs a process of light load in which said program processing is simplified in a second environment operating by a battery and requiring power saving; and wherein said switching processing unit performs floating-point arithmetic in an environment operating by an external power supply in the case where said program processing performs a floating-point arithmetic, and performs arithmetic omitting numerical figures after a decimal for fractions in an environment operating by a battery.

16. A software processing apparatus which performs a prescribed program processing, comprising:

an operating environment determining unit which determines whether an operating environment requires power saving or not; and a switching processing unit which performs a process of heavy load which causes said program processing to be performed as ills in a first environment which operates by an external power supply and does not require power saving and performs a process of light load in which said program processing is simplified in a second environment operating by a battery and requiring power saving, and wherein, when said program processing is an animation processing, said switching processing unit performs the animation processing as it is in an environment operating by an external power supply, and performs the animation processing by thinning out images or at a lower resolution in an environment operating by a battery.

17. A software processing apparatus which performs a prescribed program processing, comprising:

an operating environment determining unit which determines whether an operating environment requires power saving or not; and a switching processing unit which performs a process of heavy load which causes said program processing to be performed as it is in a first environment which operates by an external power supply and does not require power saving and performs a process of light load in which said program processing is simplified in a second environment operating by a battery and requiring power saving; and wherein, when said program processing displays a graphical user interface, said switching processing unit performs a graphical display of the user interface in an environment operating by an external power supply, and switches over the user interface to execution of a dialog display in an environment operating by a battery.

18. A software processing method which performs a prescribed program processing, comprising:

determining whether an operating environment requires power saving or not; and performing a processing of high load causing said program processing as It is in a first environment which operates by an external power supply and does not require power saving, and performs a processing of low load which simplifies said program processing in a second environment which operates by a battery and requires power saving, and when said program processing performs floating-point arithmetic, performing a floating-point arithmetic in an environment operating by an external power supply, and performing arithmetic omitting numerical figures after a decimal for fractions in an environment operating by a battery.

19. A software processing method which performs a prescribed program processing, comprising:

determining whether an environment requires power saving or not; and performing a process of heavy load which causes said program processing to be performed as it is in a first environment which operates by an external power supply and does not require power saving and performing a process of light load in which said program processing is simplified in a second environment operating by a batter and requiring power saving, and in a case where said program processing is an animation processing, performing the animation processing as it is in an environment operating by an external power supply, and performing the animation processing by thinning out images or at a lower resolution in an environment operating by a battery.

20. A software processing method which performs a prescribed program processing, comprising:

determining whether an environment requires power saving or not; and performing a process of heavy load which causes said program processing to be performed as it is in a first environment which operates by an, external power supply and does not require power saving and performing a process of light load in which said program processing is simplified in a second environment operating by a battery and requiring power saving, and when said program processing displays a graphical user interface, performing a graphical display of the user interface in an environment operating by an external power supply, and switching over the user interface to execution of a dialog display in an environment operating by a battery.

21. A computer readable recording medium recording a program for causing a computer to execute a prescribed program process;

wherein said program causes execution of:

an operating environment determining step which determines whether an operating environment requires or not power saving; and a switching processing step which performs a process of high load which performs said program process as it is in a first environment which operates by an external power supply and does not require power saving, and performs a process of low load which simplifies said program processing in a second environment operating by a battery and requiring power saving, and wherein said switching processing step performs, when, said program processing performs a floating-point arithmetic, floating-point arithmetic in an environment operating by the external power supply, and performs arithmetic omitting numerical figures after a decimal for fractions in an environment operating by the battery.

22. A computer readable recording medium recording a program for causing a computer to execute a prescribed program process;

wherein said program causes execution of an operating environment determining step which determines whether an operating environment requires or not power saving, and a switching processing step which performs a process of high load which performs said program process as it is in a first environment which operates by an external power supply and does not require power saving, and performs a process of low load which simplifies said program process in a second environment operating by a battery and requiring power saving; and wherein said switching processing step, when said program process is an animation process, performs the animation process as it is in an environment operating by the external power supply, and performs the animation processing by thinning out images or at a lower resolution in, an environment operating by the battery.

23. A recording medium recording a program for causing a computer to execute a prescribed program processing;

wherein said program causes execution of an operating environment determining step which determines whether an operating environment requires or not power saving; and a switching processing step which performs a process of high load which performs said program processing as it is in a first environment operating by an external power supply and not requiring power saving, and performs a process of low load which simplifies said program processing in a second environment operating by a battery and requiring power saving, and wherein said switching processing step, when said program process displays a graphical user interface, performs a graphical display of the user interface in an environment operating by the external power supply, and switches over the user interface to performance of a dialog display in an environment operating by the battery.

* * * * *

UNITED STATES PATENT AND TRADEMARK OFFICE
CERTIFICATE OF CORRECTION

PATENT NO. : 6,910,139 B2  Page 1 of 1
APPLICATION NO. : 09/778088
DATED : June 21, 2005
INVENTOR(S) : Nobutaka Ishidera It is certified that error appears in the above-identified patent and that said Letters Patent is hereby corrected as shown below:

Title Page, Item (73), delete "Kaswasaki" and insert -- Kawasaki -- therefor.
Column 12, Line 64, delete "cower" and insert -- power -- therefor.
Column 13, Line 21, delete "cower" and insert -- power -- therefor.
Column 13, Line 50, after "supply" delete ",".
Column 13, Line 51, delete "required" and insert -- require -- therefor.
Column 15, Line 22, delete "ills" and insert -- it is -- therefor.
Column 15, Line 60, delete "It" and insert -- it -- therefor.
Column 16, Line 17, delete "batter" and insert -- battery -- therefor.
Column 17, Line 18, after "in" delete ",".

Signed and Sealed this

Fifth Day of December, 2006

JON W. DUDAS
*Director of the United States Patent and Trademark Office*